United States Patent
Gagnon (10) Patent No.: US 8,143,583 B2
(45) Date of Patent: Mar. 27, 2012

(54) POSITRON EMISSION TOMOGRAPHY DETECTOR ELEMENTS USING DIFFERENT SIZES OF PHOTOMULTIPLIER TUBES

(75) Inventor: Daniel Gagnon, Twinsburg, OH (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 88 days.

(21) Appl. No.: 12/557,903

(22) Filed: Sep. 11, 2009

(65) Prior Publication Data

US 2011/0062340 A1   Mar. 17, 2011

(51) Int. Cl.
*G01T 1/64* (2006.01)
(52) U.S. Cl. .............................. 250/363.03; 250/363.04
(58) Field of Classification Search ............. 250/363.03, 250/363, 363.04
See application file for complete search history.

(56) References Cited

U.S. PATENT DOCUMENTS 5,210,420 A * 5/1993 Hartz et al. ............... 250/363.03
5,442,179 A * 8/1995 Ohishi ...................... 250/363.02
5,760,401 A * 6/1998 Nelleman et al. ........ 250/363.03

OTHER PUBLICATIONS

M.E. Casey, et al., A Multicrystal Two Dimensional BGO Detector System For Positron Emission Tomography, Computer Technology and Imaging 215 Center Park Drive Knoxville, Tennessee, IEEE Transactions on Nuclear Science, vol. 33, No. 1, Feb. 1986, p. 461-463.
Chang L. Kim, et al., High Spatial Resolution Detector using an 8×8 MLS crystal array and a Quad Anode Photo-multiplier, Number of Pages (4), Nov. 22, 2002.
A. Kuhn, et al., Design of a Lanthanum Bromide Detector for TOF PET, Manuscript receivied Oct. 29, 2003, Number of Pages (5).
Tom K Lewellen, Recent develpments in PET detector technology, Published Aug. 11, 2008, Division of Nuclear Medicin, University of Washington Medical Center, p. (287-317).

* cited by examiner

*Primary Examiner* — David Porta
*Assistant Examiner* — Hugh H Maupin
(74) *Attorney, Agent, or Firm* — Oblon, Spivak, McClelland, Maier & Neustadt, L.L.P.

(57) ABSTRACT

A positron emission tomography detector module that includes an array of optically isolated crystal elements and photomultiplier tubes that receive light emitted from the array of crystal elements and are arranged to cover the array of crystal elements. The photomultiplier tubes include photomultiplier tubes having two different sizes arranged in various patterns that minimize the number of edges. The axial extent of each detector module is at least three times longer than the other axis of the detector module.

16 Claims, 9 Drawing Sheets

POSITRON EMISSION TOMOGRAPHY DETECTOR ELEMENTS USING DIFFERENT SIZES OF PHOTOMULTIPLIER TUBES

BACKGROUND OF THE INVENTION

1. Field of the Invention

This invention generally relates to a long positron emission tomography detector array, and in particular, to a long positron tomography detector array having different sizes of photomultiplier tubes (PMTs).

2. Discussion of the Background

The use of positron emission tomography (PET) is growing in the field of medical imaging. In PET imaging, a radiopharmaceutical agent is introduced into the object to be imaged via injection, inhalation, or ingestion. After administration of the radiopharmaceutical, the physical and bio-molecular properties of the agent will concentrate at specific locations in the human body. The actual spatial distribution of the agent, the intensity of the region of accumulation of the agent, and the kinetics of the process from administration to eventually elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are destroyed. Most of the time, an annihilation event produces two gamma rays at 511 keV traveling at substantially 180 degrees apart.

By detecting the two gamma rays, and drawing a line between their locations, i.e., the line-of-response (LOR), one can retrieve the likely location of the original disintegration. While this process will only identify a line of possible interaction, by accumulating a large number of those lines, and through a tomographic reconstruction process, the original distribution can be estimated. In addition to the location of the two scintillation events, if accurate timing (within few hundred picoseconds) is available, a time-of-flight (TOF) calculation can add more information regarding the likely position of the event along the line. Limitations in the timing resolution of the scanner will determine the accuracy of the positioning along this line. Limitations in the determination of the location of the original scintillation events will determine the ultimate spatial resolution of the scanner, while the specific characteristics of the isotope (e.g., energy of the positron) will also contribute (via positron range and co-linearity of the two gamma rays) to the determination of the spatial resolution the specific agent.

The collection of a large number of events creates the necessary information for an image of an object to be estimated through tomographic reconstruction. Two detected events occurring at substantially the same time at corresponding detector elements form a line-of-response that can be histogrammed according to their geometric attributes to define projections, or sinograms to be reconstructed. Events can also be added to the image individually.

The fundamental element of the data collection and image reconstruction is therefore the LOR, which is the line traversing the system-patient aperture. Additional information can be obtained regarding the location of the event. First, it is known that, through sampling and reconstruction, the ability of the system to reconstruct or position a point is not space-invariant across the field of view, but is better in the center, slowly degrading toward the periphery. A point-spread-function (PSF) is typically used to characterize this behavior. Tools have been developed to incorporate the PSF into the reconstruction process. Second, the time-of-flight, or time differential between the arrival of the gamma ray on each detector involved in the detection of the pair, can be used to determine where along the LOR the event is more likely to have occurred.

The above described detection process must be repeated for a large number of annihilation events. While each imaging case must be analyzed to determine how many counts (i.e., paired events) are required to support the imaging task, current practice dictates that a typical 100-cm long, FDG (fluorodeoxyglucose) study will accumulate several hundred million counts. The time required to accumulate this number of counts is determined by the injected dose of the agent and the sensitivity and counting capacity of the scanner.

PET imaging systems use detectors positioned across from one another to detect the gamma rays emitting from the object. Typically a ring of detectors is used in order to detect gamma rays coming from each angle. Thus, a PET scanner is typically substantially cylindrical to be able to capture as much radiation as possible, which should be, by definition, isotropic. The use of partial rings and rotation of the detector to capture missing angles is also possible, but these approaches have severe consequences for the overall sensitivity of the scanner. In a cylindrical geometry, in which all gamma rays included in a plane have a chance to interact with the detector, an increase in the axial dimension has a very beneficial effect on the sensitivity or ability to capture the radiation. Thus, the best design is that of a sphere, in which all gamma rays have the opportunity to be detected. Of course, for application to humans, the spherical design would have to be very large and thus very expensive. Accordingly, a cylindrical geometry, with the axial extent of the detector being a variable, is realistically the starting point of the design of a modern PET scanner.

Once the overall geometry of the PET scanner is known, another challenge is to arrange as much scintillating material as possible in the gamma ray paths to stop and convert as many gamma rays as possible into light. In order to be able to reconstruct the spatio-temporal distribution of the radio-isotope via tomographic reconstruction principles, each detected event will need to be characterized for its energy (i.e., amount of light generated), its location, and its timing. Most modern PET scanners are composed of several thousand individual crystals, which are arranged in modules and are used to identify the position of the scintillation event. Typically crystal elements have a cross section of roughly 4 mm×4 mm. Smaller dimensions and non-square sections are also possible. The length or depth of the crystal will determine how likely the gamma ray will be captured, and typically ranges from 10 to 30 mm. The detector module is the main building block of the scanner.

As discussed above, PET imaging relies on the conversion of gamma rays into light through fast and bright scintillation crystals, and the time pairing of individual events to recreate the location of the annihilation process. These actions require very fast detector and electronic components, but no detector design and electronics can compensate for the amount of light lost in the path from the scintillation event to the light sensor. The faction of the total amount of light collected over the amount created in the scintillator is a good measure of the efficiency of the design. To maximize the amount of light collected, it is generally better to arrange the light sensor as close as possible to the scintillation crystal and to avoid reflection and other edge effects. This forces the arrangement to be a large array detector with a short distance between the crystal and the sensor.

On the other hand, fast counting requires that multiple events be processed simultaneously, favoring optical isolation between scintillation events, and the creation of smaller detector blocks. However, a PET imaging system includes more than just a counter. In addition to detecting the presence of a scintillation event, the system will need to identify the location of the event. By properly documenting how light is being distributed to the multiple light sensors, it is possible to assign an event location for any given set of sensor responses. In this case though, light needs to be distributed to multiple sensors, contrary to the requirement of the collecting as much light at possible, and to optically isolate all events.

Currently available PET scanners have two main detector module designs. The first type is a large area detector in which an array of crystals that covers the entire axial extent of the cylinder is formed. Several modules are then arranged together to form a cylinder, each module being optically coupled to the next. An array of photosensors (e.g., photomultiplier tubes or PMTs) is placed on the modules and on the interfaces between modules. See the design shown in FIG. 1A, which illustrates a module that includes an array of crystal elements and an array of PMTs. This approach minimizes the number of optical interfaces and boundaries, and ensures excellent light collection. However, this design suffers from larger numbers of sensors being exposed to the light of a single scintillation event, potentially limiting the ability to process events occurring close to each other, as well as limiting the overall counting capacity.

Figure 1A:
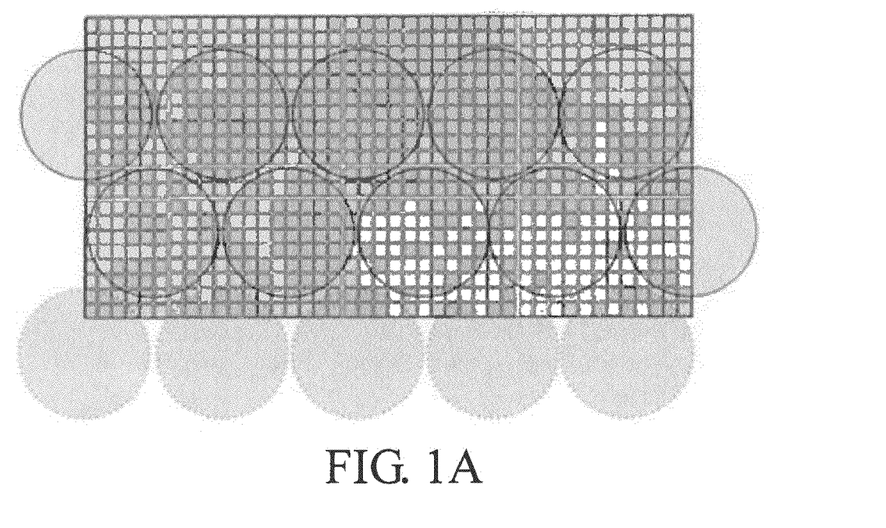
FIGS. 1A-1C illustrates conventional detector designs.
Figure 1B:
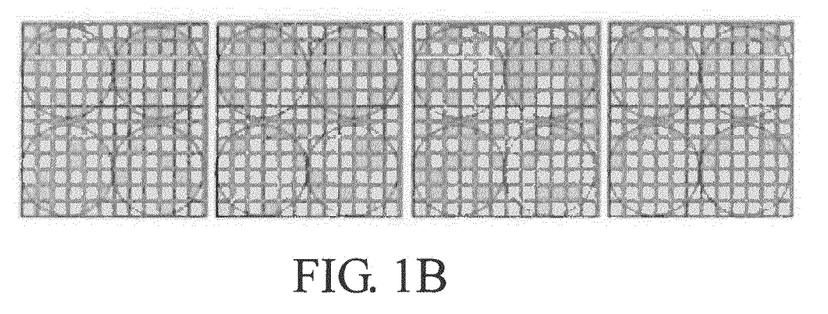
Figure 1C:
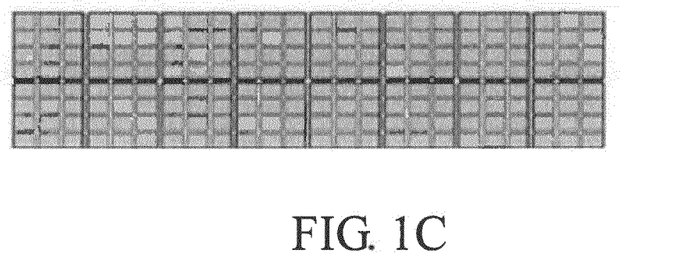

The second design is based upon an optically isolated block having, for example, four PMT sensors, so as to allow for simplified crystal identification. In the design of FIG. 1A, a block element is composed of four photomultiplier tube sensors on an approximately 50 mm×50 mm crystal assembly. In this approach, the crystals extend to the very edge of the array and a relatively thick light guide is therefore necessary to capture enough light from all PMTs to be able to detect the position of the event. A detector is then formed by arranging multiple blocks (e.g., three or four) to fill out the axial extent, and then repeating this pattern to create the overall cylinder. See the designs shown in FIGS. 1B and 1C. The advantages of this approach include greater flexibility (the detector block is potentially fully functional outside of the scanner (meaning that the detector block can be calibrated separately—as opposed to the large area, continuous detector that can only be calibration as part of a complete system—offering advantages for service at the customer site and for manufacturing of the scanner)) and better count capacity due to the potential parallel operation of each module. The disadvantages of this design are the inclusion of a large number of optical surfaces, potentially interfering with efficient light collection, and a more limited set of options for sensor coverage.

In addition to the overall geometry and the design of the detector module, a third major element in defining a modern PET system is the crystal-light sensor assembly. Two main factors influence the design of the light sensor coverage of a crystal array: (1) the sensor layout, and (2) the sensor size. Both factors affect the cost of a scanner of a pre-determined size. In the case of round photomultipliers, only two layout options are possible: rectangular and hexagonal compact arrangements. The hexagonal compact arrangement offers a higher density of coverage, but is essentially incompatible with the small square block design. Existing scanners therefore favor hexagonal compact layout for large-area module designs, and rectangular layout for small-square block designs.

In order to capture as much light as possible from the scintillation process, for the same crystal assembly and optical material, the ratio of photosensor area to the surface of crystal is a good indicator of the detection potential. While the hexagonal arrangement has the best coverage of approximately 90% ($\pi/4 \cdot \sin(\pi/6)$) in a continuous mode (infinite crystal and PMT arrays), its efficiency to cover square or rectangular areas greatly suffers at the boundaries. A rectangular layout (even with a circular sensor) is certainly more convenient, even with a decrease of coverage efficiency to 78% ($\pi/4$).

SUMMARY OF THE INVENTION

An exemplary embodiment of the present invention provides a positron emission tomography (PET) detector module, including (1) an array of optically isolated crystal elements; and (2) a plurality of photomultiplier tubes arranged to cover the array of crystal elements and configured to receive light emitted from the array of crystal elements, wherein the plurality of photomultiplier tubes includes a first photomultiplier tube having a first size and a second photomultiplier tube having a second size different from the first size, so that the first and second photomultiplier tubes cover different-sized portions of the array of crystal elements.

According to another embodiment of the detector module, the plurality of photomultiplier tubes are arranged so that (1) a pair of photomultiplier tubes having the first size are arranged along a shorter axis of the array, (2) a single photomultiplier tube having the second size is arranged adjacent to the pair of photomultiplier tubes, and (3) additional pairs of photomultiplier tubes having the first size and single photomultiplier tubes having the second size are alternately arranged to fill the axial extent of the detector module. Further, in one embodiment, the photomultiplier tubes having the first size have a one-inch diameter and the photomultiplier tubes having the second size have a 1.5-inch diameter, while in another embodiment, the photomultiplier tubes having the first size have a one-inch diameter and the photomultiplier tubes having the second size have a 2-inch diameter.

According to another embodiment of the detector module, the plurality of photomultiplier tubes are arranged in first and second rows, each having a plurality of columns; the first row includes photomultiplier tubes of only the first and second sizes, wherein every other photomultiplier tube starting with the first column in the first row has the first size; and the second row includes photomultiplier tubes of only the first and second sizes, wherein every other photomultiplier tube starting with the first column in the second row has the second size. Further, in one embodiment, the photomultiplier tubes of the first size have a one-inch diameter and the photomultiplier tubes of the second size have a 1.5-inch diameter, while in another embodiment, the photomultiplier tubes of the first size have a 1.5-inch diameter and the photomultiplier tubes of the second size have a one-inch diameter.

According to still another embodiment of the detector module, the plurality of photomultiplier tubes are arranged in first and second rows, each having a plurality of columns; the first row includes photomultiplier tubes of only the first and second sizes, wherein starting with the first column in the first row, a pair of photomultiplier tubes of the first size are alternately arranged with a single photomultiplier tube of the second size to fill an axial extent of the first row; and the second row includes photomultiplier tubes of only the first and second sizes, wherein starting with the first column in the second row, a single photomultiplier tube of the second size is alternately arranged with a pair of photomultiplier tubes of the first size to fill the axial extent of the second row. Further, in one embodiment, the photomultiplier tubes having the first size have a one-inch diameter and the photomultiplier tubes having the second size have a 1.5-inch diameter, while in another embodiment, the photomultiplier tubes having the first size have a one-inch diameter and the photomultiplier tubes having the second size have a 2-inch diameter.

According to still another embodiment of the detector module, the plurality of photomultiplier tubes are arranged in first and second rows, each having a plurality of columns; the first row includes photomultiplier tubes of only the first and second sizes, wherein starting with the first column in the first row, a single photomultiplier tube of the second size is alternately arranged with a pair of photomultiplier tubes of the first size to fill an axial extent of the first row; and the second row includes photomultiplier tubes of only the first and second sizes, wherein starting with the first column in the second row, a pair of photomultiplier tubes of the first size are alternately arranged with a single photomultiplier tube of the second size to fill the axial extent of the second row.

According to some embodiments of the present invention, the plurality of photomultiplier tubes are arranged to cover the array of crystal elements so that exactly one photomultiplier tube or exactly two photomultiplier tubes are arranged along a shorter axis of the array.

Further, in some embodiments of the present invention, the axial extent of the array is at least three times a length of the shorter axis of the array.

In another embodiment of the present invention, the plurality of photomultiplier tubes further include a third photomultiplier tube having a third size different from the first and second sizes, so that the first, second, and third photomultiplier tubes cover different-sized portions of the array of crystal elements.

According to embodiments of the present invention, the positron emission tomography detector module further includes a light guide arranged between the array of crystal elements and the plurality of photomultiplier tubes.

Another exemplary embodiment of the present invention provides a positron emission tomography scanner system, including: a plurality of rectangular detector modules arranged adjacent to one another to form a cylindrical detector ring, wherein each of the detector modules includes (1) an array of optically isolated crystal elements; and (2) a plurality of photomultiplier tubes arranged to cover the array of crystal elements and configured to receive light emitted from the array of crystal elements, wherein the plurality of photomultiplier tubes includes a first photomultiplier tube having a first size and a second photomultiplier tube having a second size different from the first size, so that the first and second photomultiplier tubes cover different-sized portions of the array of crystal elements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A-4C illustrate different arrangements of PMTs according to embodiments of the present invention.

DETAILED DESCRIPTION OF THE PREFERRED EMBODIMENTS

Figure 2A:
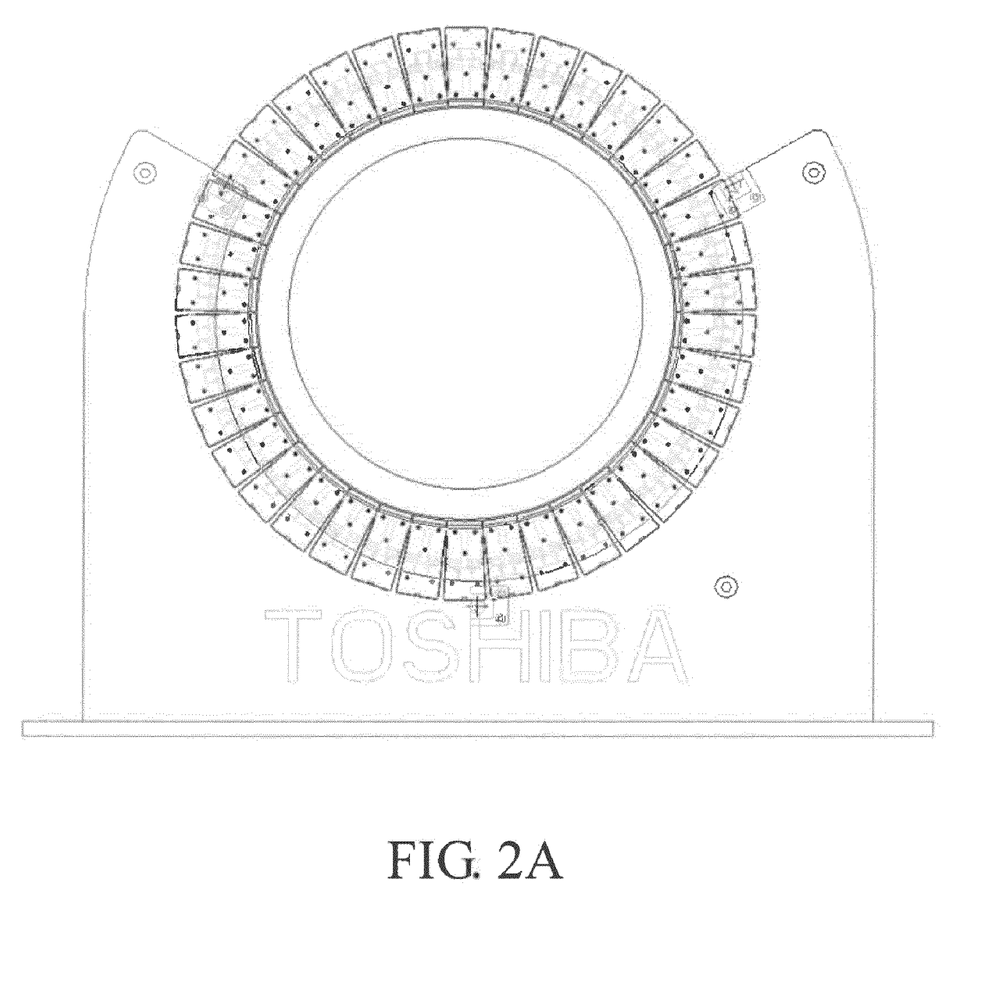
FIGS. 2A-2E illustrate a PET detector ring design that includes a plurality of modules.
Figure 2B:
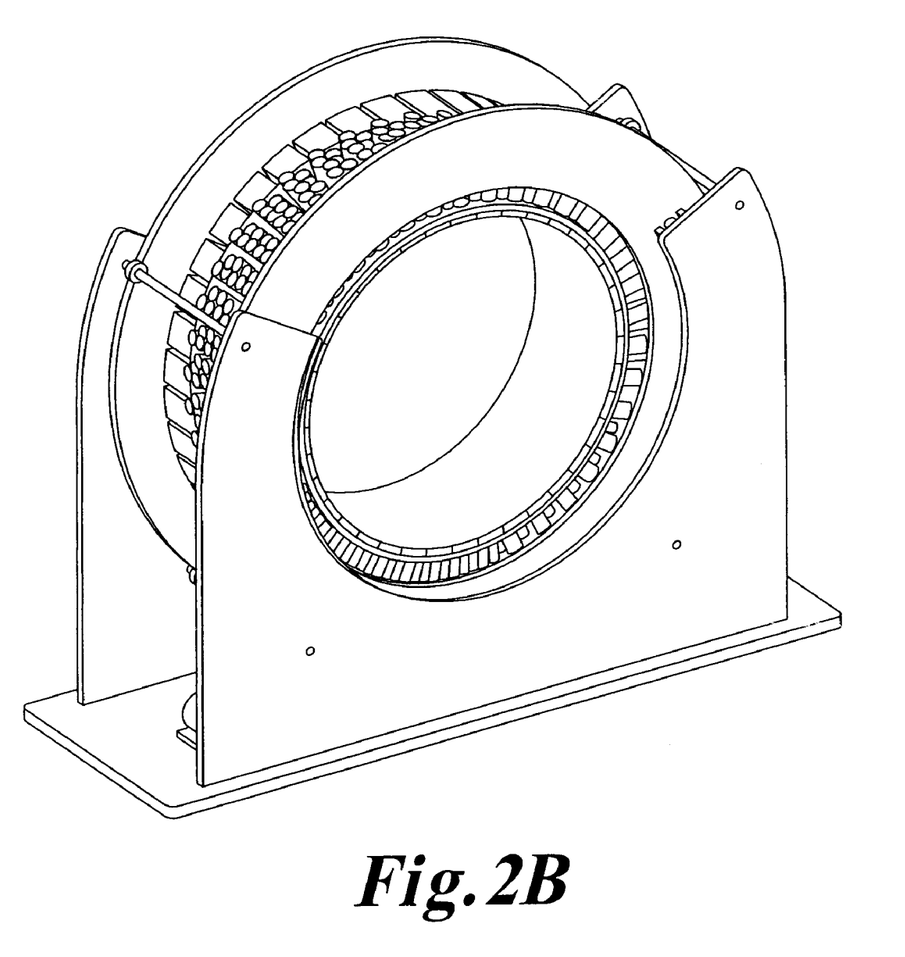

Referring now to the drawings, wherein like reference numerals designate identical or corresponding parts throughout the several views, FIGS. 2A and 2B illustrates a PET scanner design according to one embodiment of the present invention. As shown in FIGS. 2A and 2B, a detector ring is comprised of a number of rectangular detector modules. According to one embodiment, the detector ring comprises 40 detector modules. In another embodiment, 48 modules are used to create a larger bore size for the scanner.

Figure 2C:
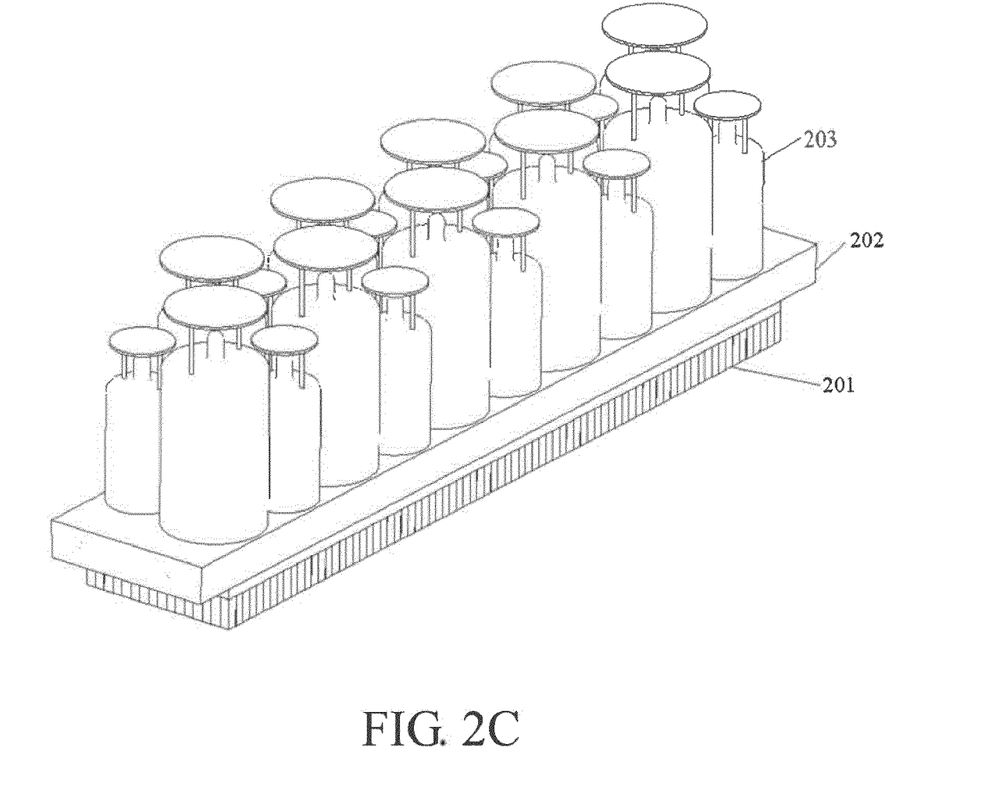
Figure 2D:
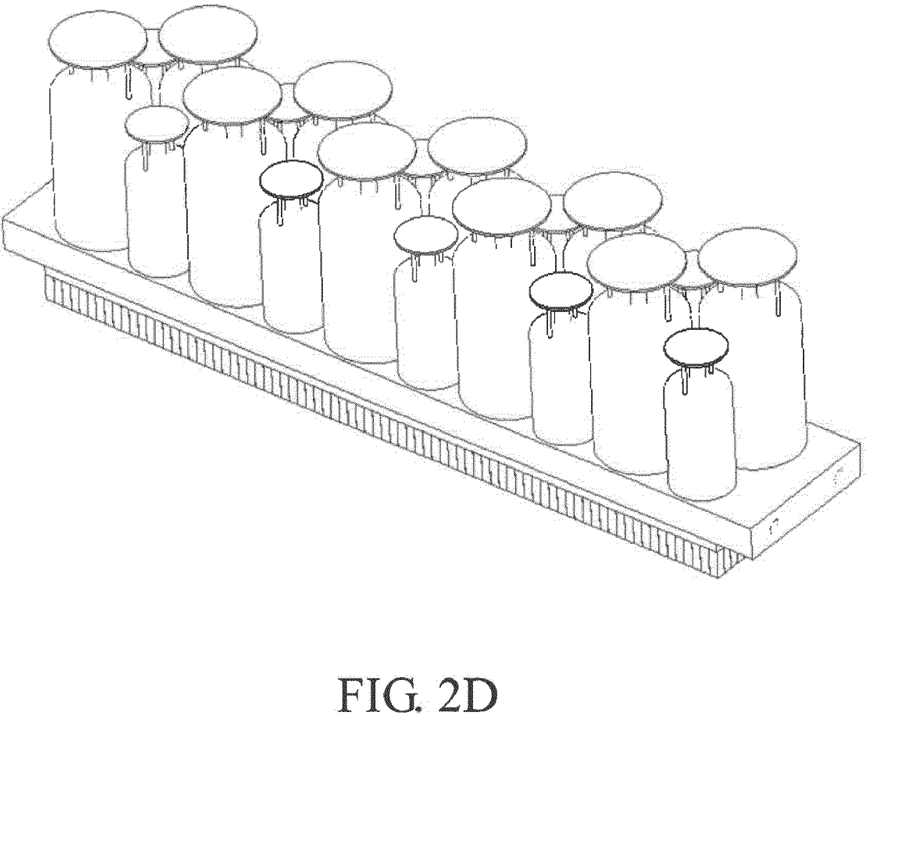
Figure 2E:
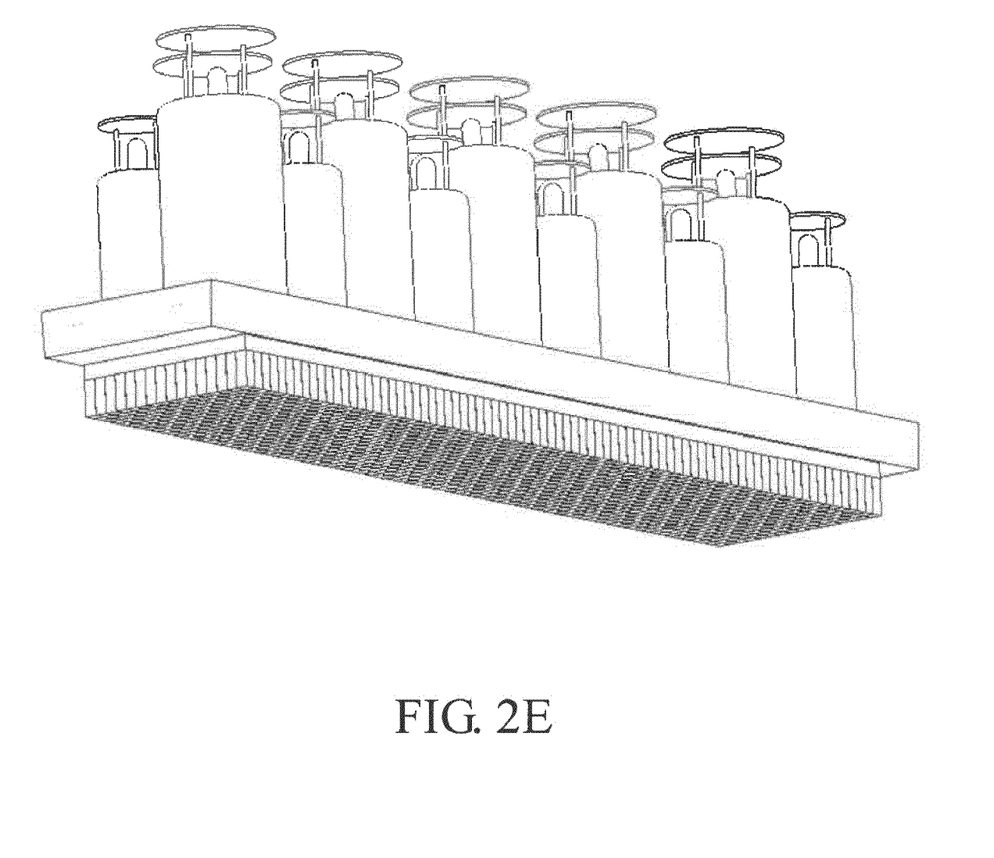

As shown in FIGS. 2C-2E, each detector module includes a two-dimensional array of individual detector crystals 201, which absorb the gamma radiation and emit scintillation photons, which are detected by the photomultiplier tubes 203. A light guide 202 is disposed between the array of detector crystals and the PMTs. As shown in FIGS. 2C-2E, each detector module includes a number of photomultiplier tubes of various sizes, each of which covers a plurality of detector crystals. Each PMT produces an analog signal which rises sharply when a scintillation event occurs, and then tails off exponentially. The photons emitted from one detector crystal can be detected by more than one PMT. However, based on the analog signal produced at each PMT, the detector crystal corresponding to an event can be determined.

The detector module shown in various views in FIGS. 2C, 2D, and 2E is narrow and long. Typically, the long axis is more than 3-4 times longer than the short axis. This design minimizes the number of edges and still produces a large enough multiplicity of independent modules to ensure an adequate counting capacity. Being optically isolated, the entire array can be calibrated independently. Further, by limiting the extent of the crystal, a thinner light guide can be used, which results in better light collection and timing.

This embodiment introduces a new type of layout combining two features. First, the crystal layout uses elements of both the continuous and block design in that it has a continuous array in one dimension, while acting like a block in the other direction. The second feature is that the novel design uses PMTs of two or more sizes to accomplish the coverage of the crystal array. A constraint on this design is the current availability of PMTs. Currently available, mass producible, fast PMTs are only available in 1", 1.5", and 2" diameters. However, the embodiments of the present invention include the arrangement of PMTs having sizes other than those set forth above.

Figure 3A:
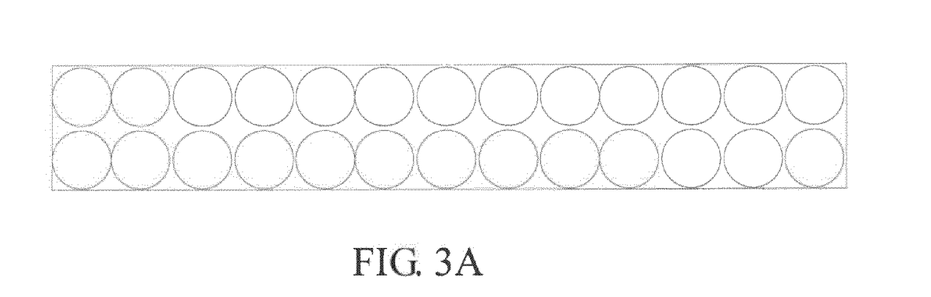
Figure 3B:
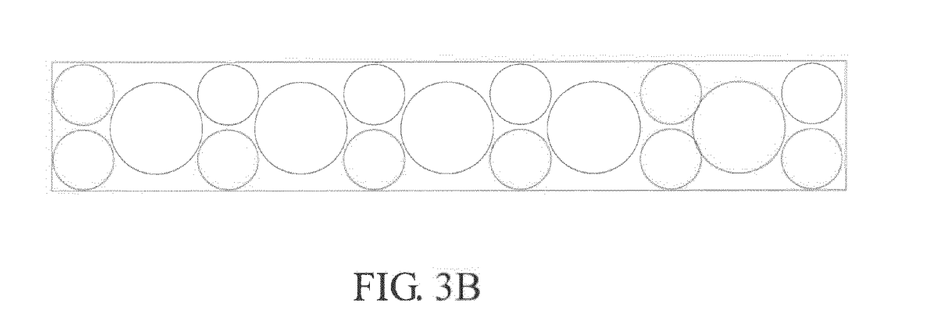
Figure 3C:
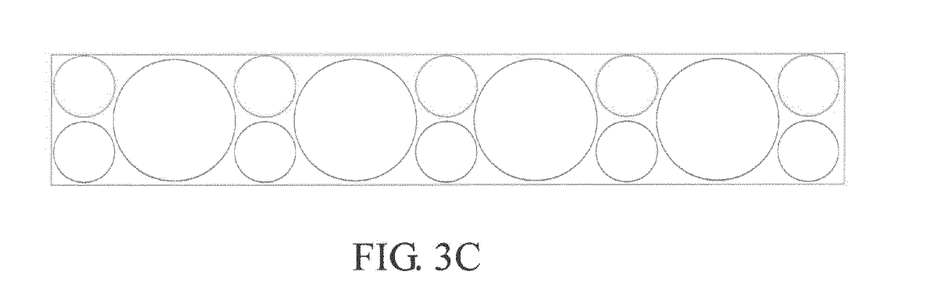

FIGS. 3A, 3B, and 3C illustrate three different detector module designs with regard to the arrangement of the PMTs. One can easily appreciate that, for the same module width, a much larger axial field-of-view can be defined with fewer tubes if the hybrid design is used, with potentially very significant impact on the overall system cost. In terms of performance with respect to light detection, which directly affects timing and energy resolution, the coverage of the crystal array as defined above can be used to test the quality of the layout. In fact, for substantially the same length, on can employ, 26, 17, or 14 PMTs to cover the axial length, as shown in FIGS. 3A, 3B, and 3C, respectively.

In FIG. 3A, one-inch PMTs are arranged in two rows on the detector module, while in FIG. 3B, two one-inch PMTs are alternated with a single 1.5-inch PMTs along the axial length of the detector module. In FIG. 3C, two one-inch PMTs are alternated with a single 2-inch PMTs along the axial length of the detector module. Note that fewer one-inch PMTs are used in the design of FIG. 3C as compared to the design of FIG. 3B, due to the use of 2-inch PMTs in the design of FIG. 3C.

In addition to capturing light, the PET detection process must also identify where the light is coming from, at least from which crystal. The so-called Anger-logic (named for H. Anger's invention of the gamma camera), which uses individual PMT responses to form centroids in the X and Y directions, is typically used to locate the originating crystal. Thus, it can be appreciated that arrangement shown in FIG. 3C using one- and two-inch PMTs offers limited sampling along the short axis, making the crystal identification more difficult. The design shown in FIG. 4A cures the deficiency of the design shown in FIG. 3A in this regard.

Figure 4A:
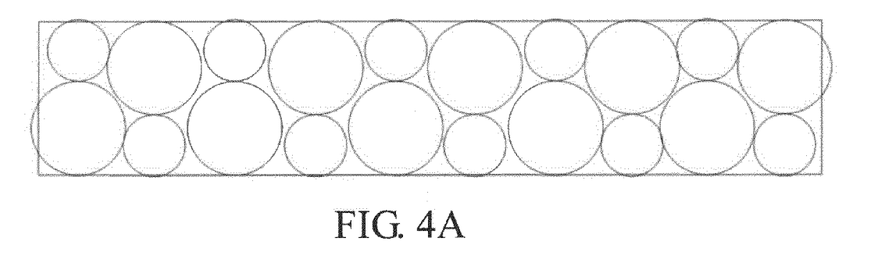

In FIG. 4A, 1-inch and 1.5-inch PMTs are alternately arranged in two rows along the axial extent of the detector module. In this embodiment, a relatively small increase in the short axis dimension, allows for two PMTs to be placed, therefore providing a much better sampling in that dimension. This particular arrangement of 1" and 1.5" PMTs also offer a better sensor-to-crystal ratio of around 84%, (while based on the same principle of calculating the surface of the circle to the surface of the crystal array set above, no simple closed-form formula is offered). Thus, the detector array shown in FIG. 4A is 25% larger than the ones shown in FIGS. 3A-3C (meaning that 25% fewer modules would be required to define the full cylinder) and uses 20 PMTs to define the same axial length. Thus, the module design shown in FIG. 4A provides a very significant cost advantage compared to the design shown in FIG. 3A, which requires 26 one-inch PMTs for the same axial length, and requires more modules.

Alternatively, one can use the 1.5" and 2" PMTs in an arrangement similar to that shown in FIG. 4A, with a slight degradation in the sampling performance along the short axis.

Figure 4B:
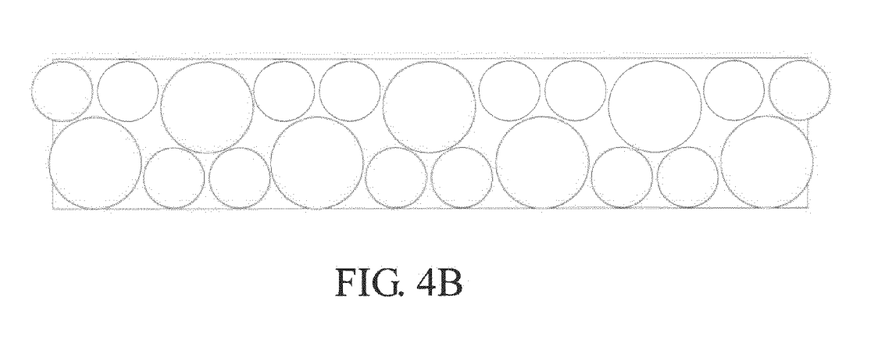
Figure 4C:
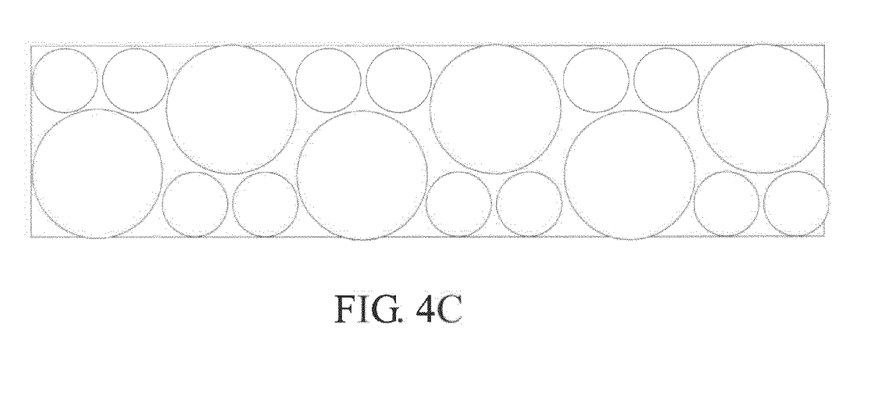

As shown in FIGS. 4B and 4C, two other arrangements of PMTs of different sizes will result in intermediate performance in terms of sampling quality and sensor-to-crystal coverage, compared to the designs shown in FIGS. 3A and 4A. In FIG. 4B, two one-inch PMTs and a single 1.5-inch PMT are alternated in two rows along the axial extent of the detector module. In FIG. 4C, two one-inch PMTs and a single 2-inch PMT are alternated in two rows along the axial extent of the detector module. In alternative embodiments, the first and second rows shown in FIGS. 4B and 4C can be switched, such that the first row begins with a 1.5-inch or 2-inch PMT.

Figure 5:
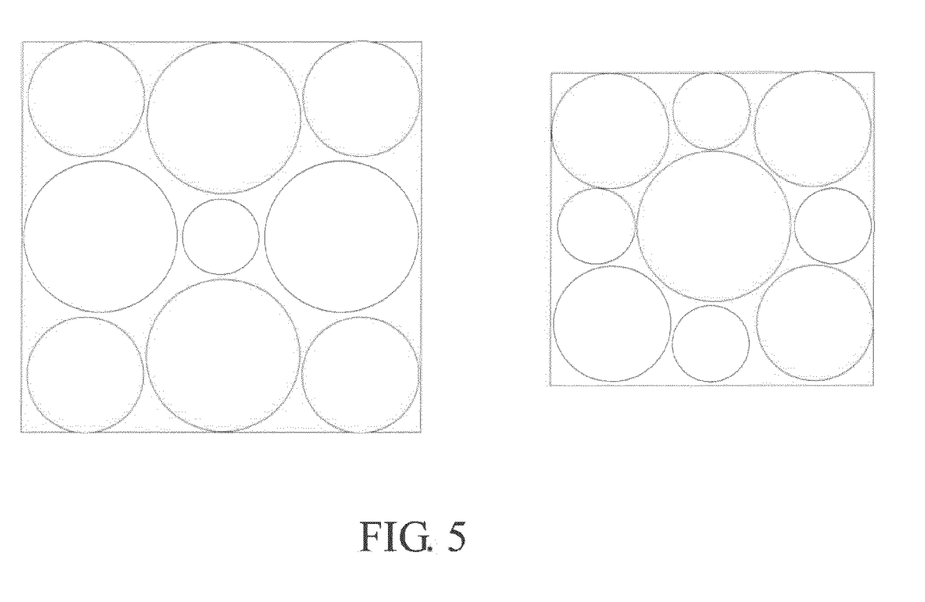
FIG. 5 illustrates two detector designs using a combination of PMTs of three different sizes.

In addition, as shown in FIG. 5, designs using a combination of three sizes of PMTs are possible. However, the designs shown in FIG. 5 deviate from the goal of defining modules that are as narrow as possible, which results in better light isolation in one dimension.

The above-described embodiments of the present invention provide more efficient sensor coverage of rectangular crystal arrays, thus improving energy and timing resolution, while minimizing the number of sensors required to capture the light, which reduces cost.

Numerous modifications and variations of the embodiments of the present invention are possible in light of the above teachings. It is therefore to be understood that within the scope of the appended claims, the invention may be practiced otherwise than as specifically described herein.

The invention claimed is:

1. A positron emission tomography detector module, comprising:
   an array of optically isolated crystal elements; and
   a plurality of photomultiplier tubes, each having a circular cross-section, the photomultiplier tubes arranged to cover the array of crystal elements and configured to receive light emitted from the array of crystal elements,
   wherein the plurality of photomultiplier tubes includes first photomultiplier tubes having a first size and second photomultiplier tubes having a second size larger than the first size, so that the first and second photomultiplier tubes cover different-sized portions of the array of crystal elements; and
   each second photomultiplier tube having the second size is adjacent to at least two first photomultiplier tubes having the first size.

2. The positron emission tomography detector module of claim 1, wherein the plurality of photomultiplier tubes are arranged so that (1) a pair of photomultiplier tubes having the first size are arranged along a shorter axis of the array, (2) a single photomultiplier tube having the second size is arranged adjacent to the pair of photomultiplier tubes, and (3) additional pairs of photomultiplier tubes having the first size and single photomultiplier tubes having the second size are alternately arranged to fill the axial extent of the detector module.

3. The positron emission tomography detector module of claim 2, wherein the photomultiplier tubes having the first size have a one-inch diameter and the photomultiplier tubes having the second size have a 1.5-inch diameter.

4. The positron emission tomography detector module of claim 2, wherein the photomultiplier tubes having the first size have a one-inch diameter and the photomultiplier tubes having the second size have a 2-inch diameter.

5. The positron emission tomography detector module of claim 1, wherein the plurality of photomultiplier tubes are arranged in first and second rows, each having a plurality of columns;
   the first row includes photomultiplier tubes of only the first and second sizes, wherein every other photomultiplier tube starting with the first column in the first row has the first size; and
   the second row includes photomultiplier tubes of only the first and second sizes, wherein every other photomultiplier tube starting with the first column in the second row has the second size.

6. The positron emission tomography detector module of claim 5, wherein the photomultiplier tubes of the first size have a one-inch diameter and the photomultiplier tubes of the second size have a 1.5-inch diameter.

7. The positron emission tomography detector module of claim 5, wherein the photomultiplier tubes of the first size have a 1.5-inch diameter and the photomultiplier tubes of the second size have a one-inch diameter.

8. The positron emission tomography detector module of claim 1, wherein the plurality of photomultiplier tubes are arranged in first and second rows, each having a plurality of columns;
   the first row includes photomultiplier tubes of only the first and second sizes, wherein starting with the first column in the first row, a pair of photomultiplier tubes of the first size are alternately arranged with a single photomultiplier tube of the second size to fill an axial extent of the first row; and
   the second row includes photomultiplier tubes of only the first and second sizes, wherein starting with the first column in the second row, a single photomultiplier tube of the second size is alternately arranged with a pair of photomultiplier tubes of the first size to fill the axial extent of the second row.

9. The positron emission tomography detector module of claim 8, wherein the photomultiplier tubes having the first size have a one-inch diameter and the photomultiplier tubes having the second size have a 1.5-inch diameter.

10. The positron emission tomography detector module of claim 8, wherein the photomultiplier tubes having the first size have a one-inch diameter and the photomultiplier tubes having the second size have a 2-inch diameter.

11. The positron emission tomography detector module of claim 1, wherein the plurality of photomultiplier tubes are arranged in first and second rows, each having a plurality of columns;
   the first row includes photomultiplier tubes of only the first and second sizes, wherein starting with the first column in the first row, a single photomultiplier tube of the second size is alternately arranged with a pair of photomultiplier tubes of the first size to fill an axial extent of the first row; and
   the second row includes photomultiplier tubes of only the first and second sizes, wherein starting with the first column in the second row, a pair of photomultiplier tubes of the first size are alternately arranged with a single photomultiplier tube of the second size to fill the axial extent of the second row.

12. The positron emission tomography detector module of claim 1, wherein the plurality of photomultiplier tubes are arranged to cover the array of crystal elements so that exactly one photomultiplier tube or exactly two photomultiplier tubes are arranged along a shorter axis of the array.

13. The positron emission tomography detector module of claim 1, wherein the axial extent of the array is at least three times a length of the shorter axis of the array.

14. The positron emission tomography detector module of claim 1, wherein the plurality of photomultiplier tubes further include a third photomultiplier tube having a third size different from the first and second sizes, so that the first, second, and third photomultiplier tubes cover different-sized portions of the array of crystal elements.

15. The positron emission tomography detector module of claim 1, further comprising:
   a light guide arranged between the array of crystal elements and the plurality of photomultiplier tubes.

16. A positron emission tomography scanner system, comprising:
   a plurality of rectangular detector modules arranged adjacent to one another to form a cylindrical detector ring, wherein each of the detector modules includes
      an array of optically isolated crystal elements; and
      a plurality of photomultiplier tubes, each having a circular cross-section, the photomultiplier tubes arranged to cover the array of crystal elements and configured to receive light emitted from the array of crystal elements,
      wherein the plurality of photomultiplier tubes includes first photomultiplier tubes having a first size and second photomultiplier tubes having a second size larger than the first size, so that the first and second photomultiplier tubes cover different-sized portions of the array of crystal elements; and
   each second photomultiplier tube having the second size is adjacent to at least two first photomultiplier tubes having the first size.

* * * * *